April 3, 1962 J. G. SPRACKLEN 3,028,559

LIMITER-FREQUENCY DETECTOR

Filed Nov. 30, 1956 2 Sheets-Sheet 1

INVENTOR.
John G. Spracklen
BY John J. Pederson
Attorney

April 3, 1962 J. G. SPRACKLEN 3,028,559

LIMITER-FREQUENCY DETECTOR

Filed Nov. 30, 1956 2 Sheets-Sheet 2

INVENTOR.
John G. Spracklen
BY John J. Pederson
Attorney

United States Patent Office 3,028,559
Patented Apr. 3, 1962

3,028,559
LIMITER-FREQUENCY DETECTOR

John G. Spracklen, Chicago, Ill., assignor to Zenith Radio Corporation, a corporation of Delaware
Filed Nov. 30, 1956, Ser. No. 625,342
13 Claims. (Cl. 329—134)

The present invention relates to the field of frequency detection. More particularly, it relates to a new limiter-frequency detector circuit having good sensitivity and selectivity for application in frequency modulation detection systems, wireless remote control systems, and the like. Since the present invention lends itself most directly to application in wireless remote control systems of the type utilizing the presence and absence of discrete predetermined frequencies for the transmission of control information, it will be described in this environment.

With the ever increasing popularity of remotely controlled consumer apparatus such as garage doors, slide projectors, television receivers, etc., it has become economically important to develop remote control apparatus which is simple in construction, reliable in operation, and relatively inexpensive to produce in mass numbers. While many remote control systems are known in the prior art, they have, for the most part, been directed toward industrial application and, hence, are too expensive and/or too complex for consumer application.

Perhaps the simplest known way of transmitting control information between two remote points is by the presence and absence of control signals having predetermined discrete frequencies. The receiving apparatus used in such systems, to insure reliable operation, should be relatively insensitive to amplitude variations over a wide range of signal intensities and should be sufficiently selective to discriminate against undesirable spurious signals having frequency components in close proximity to the discrete predetermined control frequencies. Additionally, it is desirable that such apparatus contain provisions to render it relatively insensitive to short duration random noise pulses which may, on occasions, occur at or about one or more of the discrete control frequencies. For the sake of economy both from the point of view of initial cost and standby power consumed, it is further desirable that such receiving apparatus contain a minimum number of stages.

The circuit of the present invention combines the above enumerated requirements within a single stage. Substantial gain and the excellent ability to reject undesired signals aid in reducing the number and quality of the amplifier stages which conventionally precede the detector in receiving apparatus of the type under consideration. The unusually large change which occurs in the unidirectional output signal eliminates the need for further amplification and renders this output directly useful for the control of a relay tube or the performance of any like function.

Accordingly, it is an object of the invention to provide a new and improved limiter-frequency detector circuit.

It is a further object of the present invention to provide a new limiter-frequency detector circuit having good sensitivity and selectivity for application in frequency modulation detection systems, wireless remote control systems, and the like.

It is a still further object of the present invention to provide, for application in remote control receiver apparatus, a limiter-frequency detector circuit which is substantially insensitive to variations in the amplitude of the control signal and to random noise pulses which have frequency components at or about the discrete control frequencies.

It is a corollary object of the present invention to provide a limiter-frequency detector circuit which consumes a minimum amount of power under all operating conditions.

A limiter-frequency selector circuit constructed in accordance with the invention includes electron control means such as an electron-discharge device having a source of electrons, a pair of control electrodes, and a collector. A signal source having a frequency which is subject to deviations with respect to a predetermined frequency is coupled to one of the control electrodes. An output circuit, including an energy-storage device, is coupled to the collector electrode and means are provided for charging the energy-storage device. Further means, coupled to the input signal source and including a frequency-selective network, are provided for applying to the other of the control electrodes a gating signal having a counterphase component, with respect to the input signal, which has a maximum magnitude when the input signal is at the predetermined frequency but which exhibits proportionally reduced magnitude with increasing deviation of the input signal from the predetermined frequency. This serves to establish space current conduction between the source of electrons and the collector electrode in proportion to the magnitude of such deviation, whereby a controlled discharge path for the energy-storage device is established through the electron control means to develop an output signal in the output circuit in response to frequency deviations of the input signal.

The features of the present invention which are believed to be novel are set forth with particularity in the appended claims. The organization and manner of operation of the invention, together with further objects and advantages thereof, may best be understood by reference to the following description taken in connection with the accompanying drawings, in the several figures of which like reference numerals identify like elements, and in which:

Figures 1, 2, 6:
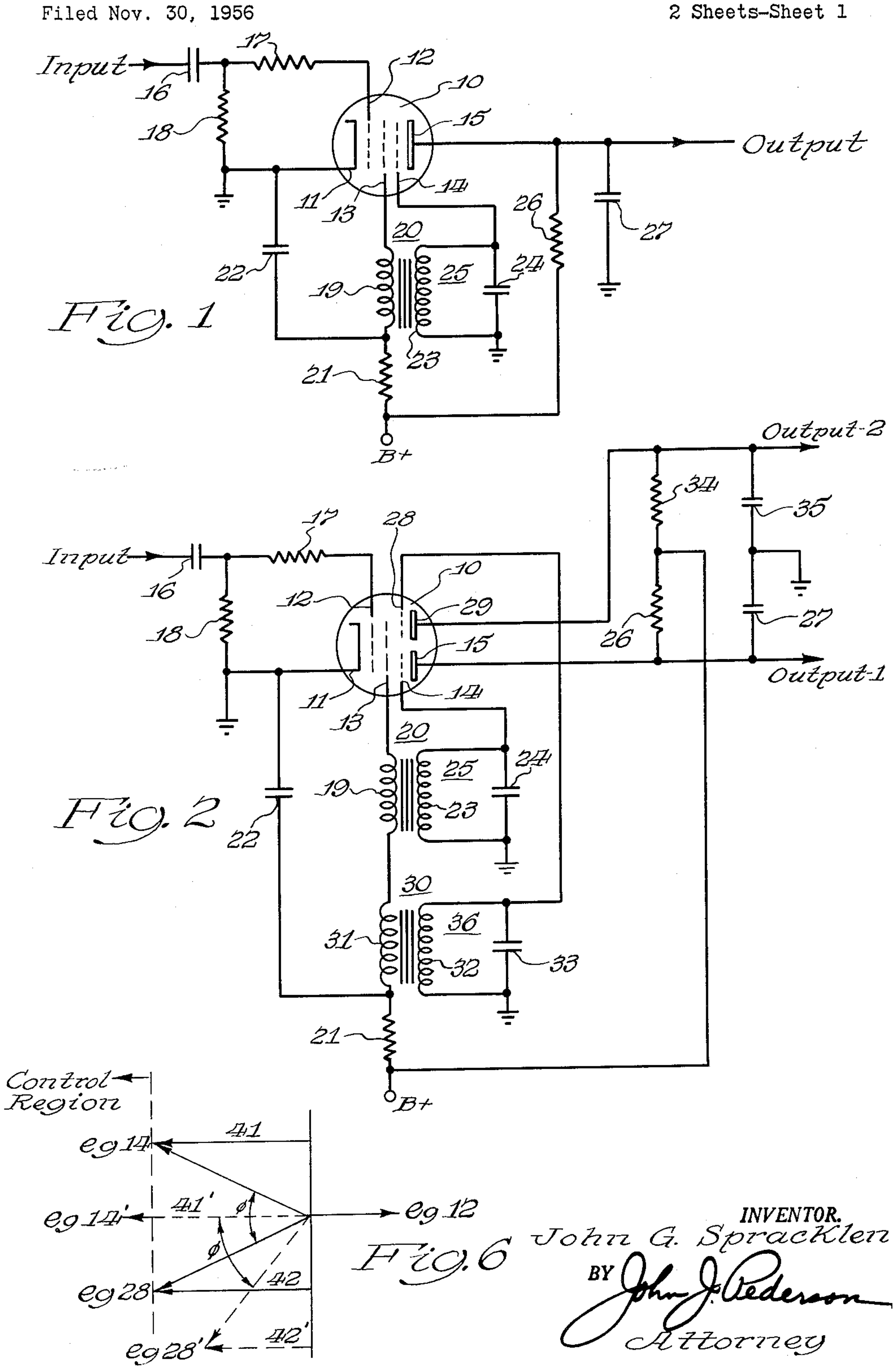
FIGURE 1 is a schematic diagram of a limiter-frequency detector constructed in accordance with the present invention.
FIGURE 2 is a schematic diagram of a balanced embodiment of the circuit of FIGURE 1.
FIGURE 6 is a vector diagram showing the phase relationships existing between certain signals appearing at various points in the circuit of FIGURE 5.

The circuit shown in FIGURE 1 is a single channel version of the present invention. Electron control means 10 is preferably an electron-discharge device of the conventional pentode type having a source of electrons or cathode 11, a first control electrode 12, an accelerator electrode or screen grid 13, a gating electrode 14 and a collector electrode or anode 15. A variable-frequency input signal is applied to control electrode 12 through the series combination of a coupling capacitor 16 and a grid-current limiting resistor 17. A grid-current return resistor 18 is coupled between cathode 11, which is grounded, and the junction of capacitor 16 and resistor 17. The primary winding 19 of a coupling transformer 20 is coupled between accelerator electrode 13 and one end of a voltage dropping resistor 21, the other end of resistor 21 being connected to the positive terminal of an appropriate unidirectional operating potential source conventionally designated B+. A signal by-pass capacitor 22 is coupled from the junction of resistor 21 and primary winding 19 to ground, and the secondary winding 23 of transformer 20 is coupled between second control electrode 14 and cathode 11. A capacitor 24 is shunted across the transformer secondary winding 23 to form a resonant circuit 25. An anode load resistor 26 is coupled between anode 15 and B+, and an energy-storage device 27 of the capacitive variety is coupled between anode 15 and ground.

Before proceeding to explain the operation of the circuit shown in FIGURE 1 under normal signal conditions, it is helpful from the point of view of clarity and understanding to establish the quiescent operating conditions of the electron control means 10. As is normally the case in electron control means of the pentode type, the density of the space current, being relatively independent of anode potential variations within reasonable limits, is primarily a function of the accelerator electrode potential. By successively increasing the magnitude of the anode load resistor, a point is reached at which further increases do not result in an appreciable lowering of the anode potential. In pentodes of conventional design this critical anode potential may be of the order of 5 to 10 volts positive for a normal accelerator electrode potential. Under these established operating conditions, a major portion of the total space current flows between the accelerator electrode and the cathode with but a minor portion in the order of hundreds of microamperes flowing between the anode and the cathode. This critical anode potential may be simply described as that which is required to insure the continued acceptance of any portion of the total space current. To produce a rise in the anode potential under such quiescent conditions it is necessary, by some means, to reduce the space current associated with the anode to substantially zero. The present invention utilizes this phenomenon to provide excellent sensitivity and selectivity characteristics, the magnitude of anode load resistor 26 being made sufficiently large to establish the aforementioned operating conditions. The major portion of the total space current as determined by the positive potential applied to accelerator electrode 13 flows between the cathode 11 and accelerator 13 with but a small portion reaching the anode 15. With the establishment of these conditions, the anode potential is reduced to the low order of magnitude previously described.

Upon the applicatiton of a signal of adequate magnitude, the duty cycle of the device is reduced to substantially 50%. Grid-current limiting resistor 17 serves to clip the positive intervals of the signal thereby preventing excessive grid current. The negative intervals of the signal, being of sufficient magnitude, serve to drive first control eelctrode 12 beyond cut-off. As a result, the space current existing between cathode 11, accelerator 13, and anode 15 consists of a series of discrete pulses which exist during the positive intervals of the input signal and which recur at a rate corresponding to the input signal frequency. In view of the large magnitude of anode load resistor 26, the charging time constant of the series RC circuit formed by resistor 26 and energy-storage capacitor 27 is long relative to the period of the input frequency. Hence during the intervals in which no space current exists, capacitor 27 accumulates a small amount of charge, the magnitude of which is determined by the aforementioned time constant. During the intervals in which space current exists, energy-storage capacitor 27 is shunted by an impedance which is substantially lower than that of anode resistor 26, and hence loses charge to the point where the anode potential has dropped to the aforementioned critical level required to maintain continuous acceptance of any portion of the space current. From this it is obvious that the average voltage appearing on anode 15 is substantially equal to the previously mentioned low value.

To further explain the operation of the circuit it is necessary, at this point, to consider the effects of the signal appearing on gating electrode 14. By virtue of the transconductance between control electrode 12 and accelerator electrode 13, a portion of the input signal appears on accelerator electrode 13. Additionally, since primary winding 19 of transformer 20 is coupled between accelerator electrode 13 and cathode 11, this signal appears across primary winding 19 and is coupled, through the mutual coupling between primary winding 19 and secondary winding 23, into resonant circuit 25. Assuming that tank circuit 25 is tuned to resonate at the frequency of the input signal and that the transformer has been properly phased, a substantially sinusoidal gating signal thus appears across the tank in exact counterphase relative to the input signal. By properly choosing the turns ratio of transformer 20, the magnitude of the signal may be made great enough to totally preclude the flow of space current between cathode 11 and anode 15. When such a condition exists there is no longer a recurring discharge path for energy-storage capacitor 27 and the charge level rises, at a rate determined by the aforementioned time constant, to a value at which the potential across capacitor 27 approaches the level of B+.

If the frequency of the input signal is now caused to deviate, by external means, in either direction from the frequency to which tank 25 is tuned, the exact counterphase condition between the gating signal and the input signal is disturbed by virtue of the frequency-phase characteristic of such resonant circuit; the gating signal either leads or lags the input signal by an amount determined by the degree of frequency deviation and the Q of tank 25. This results in a decrease in the counterphase component of the gating signal appearing on gating electrode 14, thereby establishing conduction intervals between cathode 11 and anode 15 which are a measure of the degree of deviation of the input signal above or below the resonant frequency of tank 25. Storage capacitor 27 loses charge during these conduction intervals with the net charge level dropping to the point at which the charge accumulated during the non-conduction intervals equals the charge lost during the conduction intervals. The decrease in potential level appearing across energy-storage capacitor 27 is therefore a measure of the displacement of the frequency of the input signal above or below the resonant frequency of tank 25 until the critical anode potential is reached.

Should the input frequency deviate still further in either direction, the potential appearing across energy-storage capacitor 27 remains substantially unchanged at the low critical anode potential.

Figure 3:
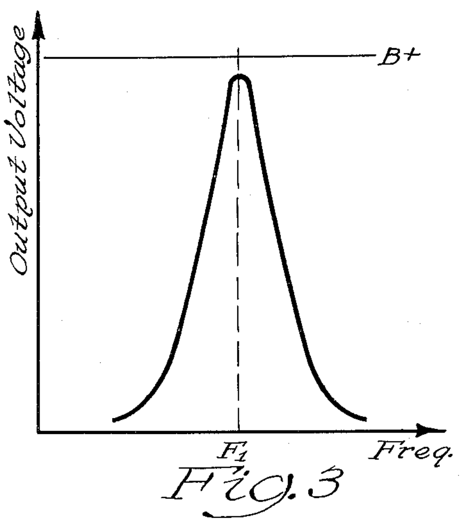
FIGURES 3 and 4 are graphical representations of the output voltage vs. frequency characteristics of the circuits of FIGURES 1 and 2, respectively.

The output voltage vs. frequency characteristic of the circuit is shown in FIGURE 3. The resonant frequency of tank 25 is designated $F_1$. It can be clearly seen that the output voltage remains at the low critical level for input frequencies displaced a significant amount above or below center frequency $F_1$. Should, however, the frequency of the input signal be caused to approach $F_1$ from either direction, the output voltage rises abruptly until it reaches a peak value in the proximity of B+ when the frequency of the input signal is exactly equal to $F_1$. From this curve it can be seen that the circuit exhibits a frequency selective characteristic which makes it useful as a detector in the receiver apparatus of remote control systems which use control signals of discrete frequencies for the transmission of control information. Since the output voltage increases through several orders of magnitude as the frequency of the input signal approaches the discrete frequency $F_1$, it may be used directly to actuate an external control means in response to control signals of frequency $F_1$. It is significant to note that the circuit is relatively insensitive to variations in the magnitude of the input signal as long as the level of the signal does not drop below that required to drive the circuit to cut off during negative intervals. Additionally, in view of the long time constant of the anode circuit, it is necessary that the input signal be sustained for a significant period of time to permit the charge on energy-storage capacitor 27 to reach a steady-state value. This imparts certain desirable characteristics to the circuit in regard to random noise, since such noise normally contains discrete frequency components at or in close proximity to $F_1$ for extremely short intervals only. The period of existence of such discrete frequency components is normally insufficient for the charge on energy-storage device 27 to change appreciably; therefore such random noise does not cause undesired actuation of the external control means.

The circuit shown in FIGURE 2 is a balanced or two-channel version of the present invention and is in many respects similar to the embodiment of FIGURE 1. Electron control means 10 has been modified to a split pentode type having, in addition to the cathode 11, control electrode 21 and accelerator 13, a pair of gating electrodes 14 and 28 and a pair of anodes 15 and 29. Alternatively, of course, two separate pentodes may be employed. The primary winding 31 of a second coupling transformer 30 is connected in series with primary winding 19 of transformer 20. The secondary winding 32 of transformer 30 is coupled between gating electrode 28 and ground and is shunted by capacitor 33 to form a second resonant circuit 36. A second anode load resistor 34 is coupled between the added anode 29 and B+, and a second energy-storage capacitor 35 is connected from anode 29 to ground.

Each half of the balanced circuit of FIGURE 2 operates in identically the same manner as the single-channel embodiment of FIGURE 1. The second resonant tank 36, formed by the parallel combination of secondary winding 32 of transformer 30 and shunt capacitor 33, is tuned to a second predetermined discrete frequency, designated $F_2$ in FIGURE 4, at which a response in output circuit 2 is desired. The same operational limitations that were discussed in connection with the circuit of FIGURE 1 apply with equal vigor to the added section of the circuit of FIGURE 2.

The operation may perhaps most easily be understood by considering deviations of an input signal about either or both of frequencies $F_1$ and $F_2$, both these frequencies thus individually representing center frequencies for respective different ones of what in effect or in actuality constitute a pair of input signals; the explanation given above with respect to the circuit of FIGURE 1 is then also applicable to the circuit of FIGURE 2, considering the two halves of the latter circuit one at a time. Alternatively, the operation of the circuit of FIGURE 2 may be explained with reference to deviation of an input signal about a frequency intermediate frequencies $F_1$ and $F_2$ such as median frequency $F_0$ as shown in FIGURE 4.

Figure 4:
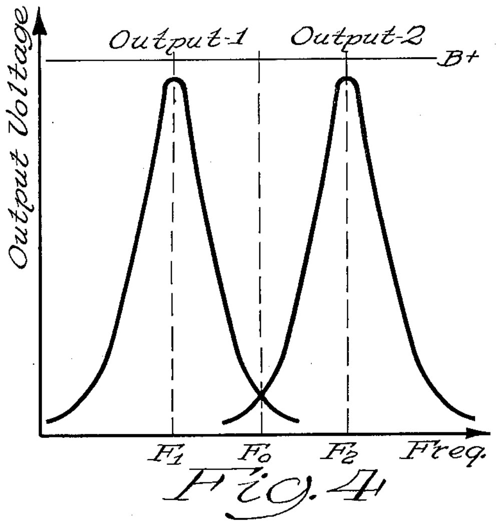

As shown in FIGURE 4, two output signals can be derived at the discrete center frequencies $F_1$ and $F_2$ to which resonant tanks 25 and 36 are tuned. If, for example, the input signal has a frequency at or about $F_1$, the counterphase component of the gating signal derived from resonant tank 25 and applied to gating electrode 14, has an amplitude at or near maximum and the potential appearing across energy-storage capacitor 27 rises to a value approaching the level of B+. The counterphase component of the signal derived from resonant tank 36 and applied to gating electrode 28 at frequency $F_1$ is substantially below that required to produce an appreciable rise in the potential appearing across energy-storage capacitor 35. The converse occurs if the frequency of the input signal is at or about $F_2$; the gating signal applied to gating electrode 28 has a maximum counterphase component causing the potential appearing across energy-storage capacitor 35 to rise to a level approaching B+, while the gating signal applied to gating electrode 14 has a counterphase component of a magnitude substantially below that required to produce an appreciable rise in the potential appearing across energy-storage capacitor 27. As such, the circuit is capable of generating independent output signals at the two aforementioned discrete frequencies for application in the actuation of two external independent control means. The locations of the discrete response frequencies in the frequency spectrum may be chosen as desired by the independent tuning of resonant circuits 25 and 36. By choosing resonant circuits having relatively high figures of merit (Q), the discrete response frequencies can be positioned proportionally close without a substantial rise occurring in the potential across either of the energy storage capacitors when the input signal has a frequency equal to the median frequency $F_0$.

Figure 5:
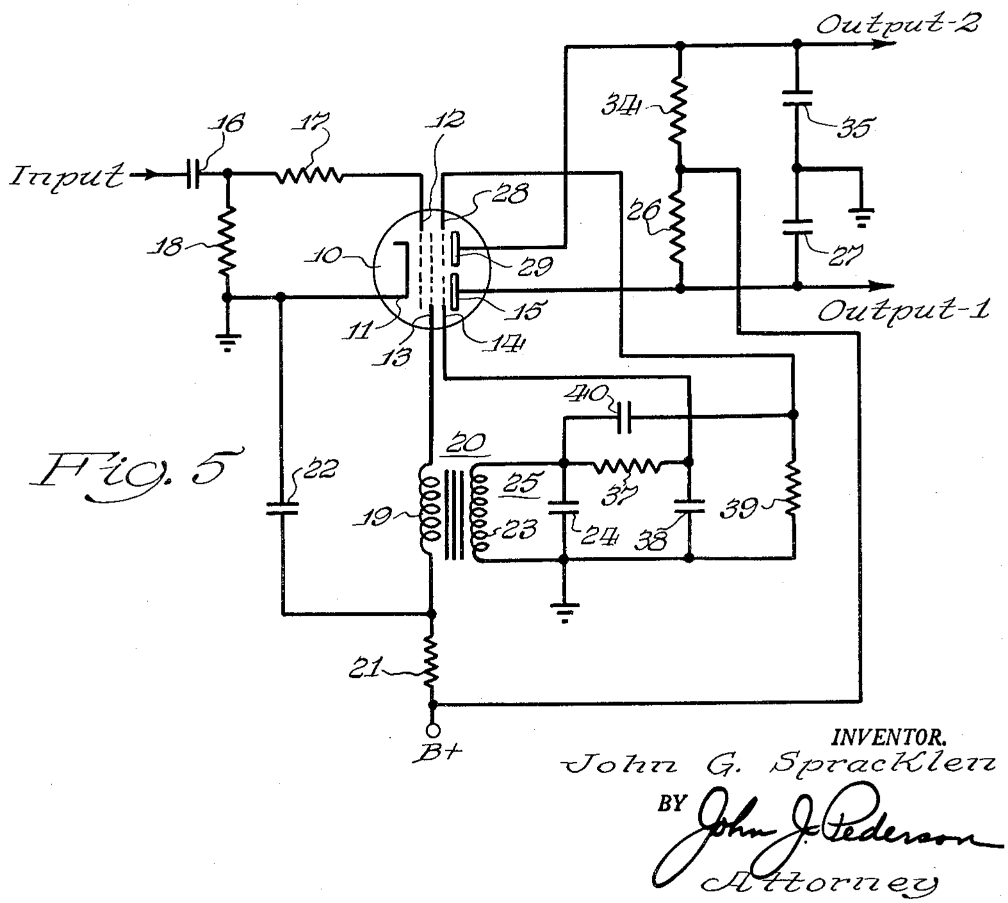
FIGURE 5 is a schematic diagram of a modification of the circuit shown in FIGURE 2.

The circuit of FIGURE 5 is an improvement over the balanced embodiment of the present invention shown in FIGURE 2. One of the coupling transformers and its associated resonant circuit have been eliminated, resulting in an embodiment having but a single transformer 20 and a single resonant circuit 25. The gating signals for application to gating electrodes 14 and 28 are derived from a common point in the resonant circuit 25 through the medium of a pair of RC (resistance-capacity) phase-shift networks each including a resistor and a capacitor of appropriate magnitude. The networks are so constructed as to introduce a phase-advance and a phase-delay into the respective gating signals applied to gating electrodes 28 and 14 relative to the signal appearing across resonant circuit 25. Gating electrode 14 is coupled to the junction of the series combination of a resistor 37 and a capacitor 38, the combination being coupled in shunt with resonant circuit 25. Similarly, second gating electrode 28 is coupled to the junction of a second series combination including capacitor 40 and resistor 39; this combination is, in turn, coupled in shunt with resonant circuit 25. Unlike the balanced embodiment which utilizes two tuned circuits, resonant circuit 25 is tuned to the median frequency, designated $F_0$ in FIGURE 4, rather than to the discrete frequency at which an output response is desired. The magnitudes of the resistors 37, 39 and condensers 38, 40 are chosen such that, over a band of frequencies with $F_0$ as the center, leading and a lagging phase shifts are introduced into the respective gating signals appearing on gating electrodes 28 and 14 relative to the signal appearing across resonant circuit 25. By virtue of the parameters of the phase-shift networks, the phase difference existing between the gating signals is substantially fixed and less than 180 degrees. This phase difference, as the result of the relative phase-frequency insensitivity of simple RC networks of the type used, remains substantially constant over an appreciable range of frequency departure in either direction from $F_0$. By again properly phasing transformer 20, the gating signals appearing on the gating electrodes can be made to have counterphase components which are of equal magnitude when the input signal has a frequency equal to $F_0$. By virtue of the frequency-phase characteristic of resonant circuit 25, frequency variations in the input signal in either direction about $F_0$ cause the magnitude of the counterphase components to vary in opposite senses, resulting in a rise in the potential appearing across one or the other of the energy-storage capacitors 35 and 27.

To illustrate more clearly the action of the circuit, a frequency deviation of specific magnitude and in a particular direction relative to $F_0$ can be considered; it should be observed, however, that the operation may also be explained with reference to deviation of the input signal about either or both frequencies $F_1$ and $F_2$ in the manner mentioned above with respect to FIGURE 2, since the combination of transformer 20 individually with each one of the phase shift networks develops a counterphase gating signal substantially corresponding to one of the counterphase gating signals developed in each half of the circuit of FIGURE 2. It is for this same reason that the circuit of FIGURE 2, as noted previously may be explained with reference to deviation of an input signal about median frequency $F_0$. Assume initially that the frequency of the input signal is equal to $F_0$; the gating signals $e_{g14}$ and $e_{g28}$ appearing on gating electrodes 14 and 28 respectively have, as has been previously established, the phase relationships relative to the input signal $e_{g12}$ shown by the vectors bearing unprimed numbers in FIGURE 6. The magnitude of angle is determined by the sizes of the components contained in the fixed RC phase-shift networks. As can be seen, the counterphase components 41 and 42 of the gating signals $e_{g14}$ and $e_{g28}$ are not of sufficient magnitude to extend into the control region where a significant change in the potentials appearing on anodes 15 and 29 can occur; hence no appreciable rise in the potential appearing across either of the energy-storage capacitors can occur. If the frequency of the input signal now deviates to $F_1$, the gating signal vectors shift counter-clockwise by equal amounts relative to the input signal as indicated by the primed vectors $e_{g14'}$ and $e_{g28'}$. Under these conditions, the counterphase component 41′ of the gating signal appearing on gating electrode 14 is increased to a maximum magnitude and extends into the control region where the flow of space current from cathode 11 to anode 15 is substantially reduced or completely precluded, permitting energy-storage capacitor 27 to accumulate charge at a rate determined by the charging circuit time constant. Simultaneously, the counterphase component 42′ of the gating signal appearing on gating electrode 28 is reduced in magnitude as shown; hence no appreciable change in the potential appearing across energy-storage capacitor 27 occurs with the circuit in this condition. The potential appearing at output 1 thus rises from the pre-established low critical level to a level approaching that of B+, while the potential appearing at output 2 remains substantially unchanged.

Similarly, if the frequency of the input signal deviates in the opposite sense, to a frequency $F_2$, the converse occurs with the potential rising on energy-storage capacitor 35 while the potential across capacitor 27 remains substantially unchanged.

Since the figure of merit of resonant circuit 25 determines the rate of phase change of the gating signals relative to changes in frequency of the input signal, it is desirable that the figure of merit be made relatively high to insure good selectivity. A low figure of merit produces a relativel slow rate of change resulting in a broadening of each of the discrete response curves. Highly selective response curves permit close spacing of the discrete control frequencies $F_1$ and $F_2$ without incurring the danger of an appreciable potential rise across either of the energy storage capacitors when the frequency of the input signal is at or about the median frequency $F_0$. Maximum sensitivity is best attained by utilizing an electron control means having high transconductance in combination with large anode load impedances. Choosing the proper step-up turns ratio for transformer 20 results in gating signals having maximum counterphase components sufficiently large to substantially preclude the flow of space current to the anode thereby permitting the potential appearing across the energy storage capacitors to change by a maximum amount in response to the discrete control frequencies. By adjusting the active circuit parameters in this manner, optimum circuit selectivity and sensitivity are obtained. Of course, the response frequency $F_1$ and $F_2$ may be positioned at varying distances relative to $F_0$ and to each other by changing the amount of fixed phase shift introduced into each of the gating signals relative to the signal appearing across the resonant circuit 25.

A circuit constructed in accordance with the embodiment shown in FIGURE 5 and containing the following components exhibits discrete responses in output circuits 1 and 2 respectively at input signal frequencies of 38 kilocycles and 40 kilocycles when resonant circuit 25 is tuned to 39 kilocycles.

| | |
|---|---|
| Tube type | 6BU8. |
| C16 | .001 microfarad. |
| C22 | .01 microfarad. |
| C24 | 2000 micro-microfarads |
| C40 | 40 micro-microfarads. |
| C38 | 20 micro-microfarads. |
| C27 and C35 | .001 microfarad each. |
| R17 | 47,000 ohms. |
| R18 | 25K. |
| R21 | 100K. |
| R37 | 150K. |
| R39 | 110K. |
| R26 and R34 | 2 megohms each. |
| B+ | 200 volts. |

TRANSFORMER 20

| | |
|---|---|
| Turns ratio | 1:10 step-up. |
| Secondary inductance | 8 millihenries. |

These specific component values are given by way of example only and in no sense by way of limitation.

Thus the present invention provides an amplitude insensitive frequency selector circuit of the single-ended or balanced type which may be used to advantage in the receiving apparatus of remote control systems in which the presence or absence of discrete frequencies is utilized to convey control information. By virtue of the high effective gain and the excellent selectivity of this circuit, the gain and selectivity of the earlier stages of receiving apparatus may be minimized, resulting in a saving in initial cost and power consumed. The amplitude of the output is ample for direct application to external control means without the use of additional stages of amplification. The inherent long time constant of the output circuit renders the overall operation of the circuit insensitive to random noise pulses, and hence greatly reduces the possibility of undesired spurious actuation of the external control means. While the invention has been discussed in terms of its application in remote control systems this should not be construed as a limitation, since a circuit having the enumerated properties will have valuable application wherever frequency selection or discrimination is desired. By adjusting the resonant frequencies of the resonant circuits or the parameters of the phase-advance and phase-delay networks to properly position the response frequencies in the respective balanced embodiments shown in FIGURES 2 and 5, either of the embodiments can be made to perform as limiter-discriminators in the detection of conventional frequency modulated signals. In such application, it is, of course, necessary to reduce the time constant of the anode circuits by reducing the size of the anode load resistors and/or the energy-storage capacitors to permit the net charge level appearing across the series combination of the energy storage capacitors to vary in accordance with the modulation component of the input signal.

While particular embodiments of the present invention have been shown and described, it is apparent that various changes and modifications may be made, and it is therefore contemplated in the appended claims to cover all such changes and modifications as fall within the true spirit and scope of the invention.

I claim:

1. A limiter-frequency detector circuit comprising: electron control means including a source of electrons, a pair of control electrodes, and a collector electrode; means, including a signal source, for applying to one of said control electrodes an input signal subject to frequency deviations above and below a predetermined frequency; an output circuit including an energy-storage device coupled to said collector electrode and means for charging said energy-storage device; and means including a frequency-selective network coupled to said input signal source for applying to the other of said control electrodes a gating signal having a counterphase component with respect to said input signal of maximum magnitude when said input signal is at said predetermined frequency, but of proportionally reduced magnitude with increasing deviation of said input signal from said predetermined frequency, to establish space current conduction between said source of electrons and said collector electrode in proportion to the magnitude of such deviation, whereby a controlled discharge path for said energy-storage device is established through said electron control means to develop an output signal in said output circuit in response to such frequency deviations of said input signal.

2. A limiter-frequency detector circuit comprising: electron control means including a source of electrons, a first control electrode, an accelerator electrode, a second control electrode, and a collector electrode in the order named; means, including a signal source, for applying to the first control electrode an input signal subject to frequency deviations above and below a predetermined frequency; an output circuit including an energy-storage device coupled to said collector electrode and means for charging said energy-storage device; means coupled to said accelerator electrode for deriving a portion of said input signal therefrom; and means including a frequency-selective network coupled to said last-mentioned means for applying to the second control electrode a gating signal having a counterphase component with respect to said input signal of maximum magnitude when siad input signal is at said predetermined frequency but of proportionally reduced magnitude with increasing deviation of said input signal from said predetermined frequency, to establish space current conduction between said source of electrons and said collector electrode in proportion to the magnitude of such deviation, whereby a controlled discharge path for said energy-storage device is established through said electron control means to develop an output signal in said output circuit in response to such frequency deviations of said input signal.

3. A limiter-frequency detector circuit comprising: electron control means including a source of electrons, a first control electrode, an accelerator electrode, a second control electrode, and a collector electrode in the order named; means, including a signal source, for applying to the first control electrode an input signal subject to frequency deviations above and below a predetermined frequency; an output circuit including an energy-storage device coupled to said collector electrode and means for charging said energy-storage device; a transformer having a primary winding and having a tuned secondary winding; means coupling said primary winding to said accelerator electrode to derive a portion of said input signal therefrom; and means coupling said tuned secondary winding to the second control electrode for applying a gating signal thereto having a counterphase component, with respect to said input signal, of maximum magnitude when said input signal is at said predetermined frequency but of proportionally reduced magnitude with increasing deviation of said input signal from said predetermined frequency, to establish space current conduction between said source of electrons and said collector electrode in proportion to the magnitude of such deviation, whereby a controlled discharge path for said energy-storage device is established through said electron control means to develop an output signal in said output circuit in response to such frequency deviations of said input signal.

4. A limiter-frequency detector circuit comprising: electron control means including a source of electrons, a first control electrode, an accelerator electrode, a second control electrode, and a collector electrode in the order named; means, including a signal source, for applying, to the first control electrode, an input signal subject to frequency deviations above and below a predetermined frequency; an integrating output circuit, including an energy-storage device, coupled to said collector electrode; a charging circuit for said energy-storage device including an impedance of substantial magnitude to render the time constant of said charging circuit long relative to the period of said predetermined frequency; a transformer having a primary winding and having a tuned secondary winding; means coupling said primary winding to said accelerator electrode to derive a portion of said input signal therefrom; and means coupling said tuned secondary winding to the second control electrode for applying a gating signal thereto having a counterphase component with respect to said input signal of maximum magnitude when said input signal is at said predetermined frequency but of proportionally reduced magnitude with increasing deviation of said input signal from said predetermined frequency, to establish space current conduction between said source of electrons and said collector electrode in proportion to the magnitude of such deviations, whereby a controlled discharge path for said energy storage device is established through said electron control means to develop an integrated output signal in said output circuit in response to such frequency deviations of said input signal.

5. A limiter frequency detector circuit comprising: electron control means including a source of electrons, a control electrode, a pair of collector electrodes, and a pair of gating electrodes so disposed that each influences the space current path from said source of electrons to an assigned one of said collector electrodes substantially independently of the other; means, including a signal source, for applying to said control electrode an input signal subject to frequency deviations with respect to a predetermined frequency; an output circuit including energy-storage means coupled to said collector electrodes and means for charging said energy-storage means; means coupled to said input signal source to derive a portion of said input signal therefrom; and means, including a pair of frequency selective networks tuned respectively to selected frequencies above and below said predetermined frequency and coupled to said last-mentioned means, for applying to said gating electrodes a pair of gating signals having counterphase components, with respect to said input signal, which are balanced at said predetermined frequency but which become unbalanced in opposite senses in response to frequency deviations of said input signal in respectively opposite directions from said predetermined frequency, each of said counterphase components having a maximum magnitude at an assigned one of said selected frequencies, to establish space current conduction between said source of electrons and said collector electrodes in proportion to the magnitude of such deviations, whereby a controlled discharge path for said energy-storage means is established through said electron control means to develop an output signal in said output circuit in response to such frequency deviations of said input signal.

6. A limiter-frequency detector circuit comprising: electron control means including a source of electrons, a control electrode, a pair of collector electrodes, an accelerator electrode, and a pair of gating electrodes so disposed that each influences the space current path from said source of electrons to an assigned one of said collector electrodes substantially independently of the other; means, including a signal source, for applying to said control electrode an input signal subject to frequency deviations with respect to a predetermined frequency; an output circuit including energy-storage means coupled to said collector electrodes and means for charging said energy-storage means; a pair of transformers having primary windings and having secondary windings tuned respectively to selected frequencies above and below said predetermined frequency; means coupling said primary windings to said accelerator electrode to derive a portion of said input signal therefrom; and means coupling each of said tuned secondary windings to an assigned one of said gating electrodes for applying, to said gating electrodes, a pair of gating signals having counterphase components, with respect to said input signal, which are balanced at said predetermined frequency but which become unbalanced in opposite senses in response to frequency deviations of said input signal in respectively opposite directions from said predetermined frequency, each of said counter-phase components having a maximum magnitude at an assigned one of said selected frequencies, to establish space current conduction between said source of electrons and said collector electrodes in proportion to the magnitude of such deviations, whereby a controlled discharge path for said energy-storage means is established through said electron control means to develop an output signal in said output circuit in response to such frequency deviations of said input signal.

7. A limiter-frequency detector circuit comprising: electron control means including a source of electrons, a control electrode, a pair of collector electrodes, and a pair of gating electrodes so disposed that each influences the space current path from said source of electrons to an assigned one of said collector electrodes substantially independently of the other; means, including a signal source for applying to said control electrode an input signal subject to frequency deviations with respect to a predetermined frequency; a balanced output circuit including a pair of energy-storage devices individually coupled to one of said pair of collector electrodes; respective charging circuits for said pair of energy-storage devices individually including an impedance of substantial magnitude to render the time constant of each of said charging circuits long relative to the period of said predetermined frequency; a pair of transformers having primary windings and having secondary windings tuned respectively to selected frequencies above and below said predetermined frequency; means coupling said primary windings to said input signal source to derive a portion of said input signal therefrom; and means coupling each of said tuned secondary windings to an assigned one of said gating electrodes for applying, to said gating electrodes, a pair of gating signals having counterphase components, with respect to said input signal, which are balanced at said predetermined frequency but which become unbalanced in opposite senses in response to frequency deviations of said input signal in respectively opposite directions from said predetermined frequency, each of said counterphase components having a maximum magnitude at an assigned one of said selected frequencies, to establish space current conduction between said source of electrons and said collector electrodes in proportion to the magnitude of such deviations, whereby independently controlled respective discharge paths for said energy-storage devices are established through said electron control means to develop an output signal in said output circuit in response to such frequency deviations of said input signal.

8. A limiter-frequency detector circuit comprising: electron control means including a source of electrons, a control electrode, a pair of collector electrodes, and a pair of gating electrodes so disposed that each influences the space current path from said source of electrons to an assigned one of said collector electrodes substantially independently of the other; means, including a signal source for applying to said control electrode an input signal subject to frequency deviations with respect to a predetermined frequency; means coupled to said input signal source for applying, to said gating electrodes, a pair of gating signals having counterphase components, with respect to said input signal, which are balanced at said predetermined frequency but which become unbalanced in opposite senses in response to frequency deviations of said input signal in respectively opposite directions from said predetermined frequency; energy-storage means; a charging circuit for said energy-storage means; and a discharge circuit for said energy-storage means which includes the conduction paths from said electron source to said collector electrodes for establishing, on said energy-storage means, an average charge level of a magnitude determined by the phase relation of said gating signals relative to said input signal whereby said charge level represents the frequency deviations of said input signal.

9. A limiter-frequency detector circuit comprising: electron control means including a source of electrons, a control electrode, a pair of collector electrodes, an accelerator electrode, and a pair of gating electrodes so disposed that each influences the space current path from said source of electrons to an assigned one of said collector electrodes substantially independently of the other; means, including a signal source, for applying to said control electrode an input signal subject to frequency deviations with respect to a predetermined frequency; means coupled to said accelerator electrode to derive a portion of said input signal therefrom; means coupled to said last-mentioned means for applying, to said gating electrodes, a pair of gating signals having a phase difference substantially less than 180 degrees with respect to each other and having counterphase components, with respect to said input signal, which are balanced at said predetermined frequency but which become unbalanced in opposite senses in response to frequency deviations of said input signal in respectively opposite directions from said predetermined frequency; energy-storage means; a charging circuit for said energy-storage means; and a discharge circuit for said energy-storage means which includes the conduction paths from said electron source to said collector electrodes for establishing, on said energy-storage means, an average charge level of a magnitude determined by the phase relation of said gating signals relative to said input signal whereby said charge level represents the frequency deviations of said input signal.

10. A limiter-frequency detector circuit comprising: electron control means including a source of electrons, a control electrode, a pair of collector electrodes, and a pair of gating electrodes so disposed that each influences the space current path from said source of electrons to an assigned one of said collector electrodes substantially independently of the other; means, including a signal source, for applying to said control electrode an input signal subject to frequency deviations with respect to a predetermined frequency; means, including a frequency-selective network coupled to said input signal source for deriving a portion of said input signal having a counterphase component, with respect to said input signal, which is maximum at said predetermined frequency but which decreases with frequency deviations in either sense from said predetermined frequency; means, including a phase-shift network, coupled to said last-mentioned means for applying, to said gating electrodes, a pair of gating signals having counterphase components, with respect to said input signal, which are balanced at said predetermined frequency but which become unbalanced in opposite senses in response to frequency deviations of said input signal in respectively opposite directions from said predetermined frequency; energy-storage means; a charging circuit for said energy-storage means; and a discharge circuit for said energy-storage means which includes the conduction paths from said electron source to said collector electrodes for establishing, on said energy-storage means, an average charge level of a magnitude determined by the phase relation of said gating signals relative to said input signal whereby said charge level represents the frequency deviations of said input signal.

11. A limiter-frequency detector circuit comprising: electron control means including a source of electrons, a control electrode, a pair of collector electrodes, an accelerator electrode, and a pair of gating electrodes so disposed that each influences the space current path from said source of electrons to an assigned one of said collector electrodes substantially independently of the other; means, including a signal source, for applying to said control electrode an input signal subject to frequency deviations with respect to a predetermined frequency; a transformer having a primary winding coupled to said accelerator electrode and a secondary winding tuned to said predetermined frequency for deriving from said accelerator electrode a portion of said input signal having a counterphase component, with respect to said input signal, which is maximum at said predetermined frequency but which decreases with frequency deviations in either sense from said predetermined frequency; means, including a phase-shift network, coupled to said tuned secondary winding for applying, to said gating electrodes, a pair of gating signals having counterphase components, with respect to said input signal, which are balanced at said predetermined frequency but which become unbalanced in opposite senses in response to frequency deviations of said input signal in respectively opposite directions from said predetermined frequency; energy-storage means; a charging circuit for said energy-storage means; and a discharge circuit for said energy-storage means which includes the conduction paths from said electron source to said collector electrodes for establishing, on said energy-storage means, an average charge level of a magnitude determined by the phase relation of said gating signals relative to said input signal whereby said charge level represents the frequency deviations of said input signal.

12. A limiter-frequency detector circuit comprising: electron control means including a source of electrons, a control electrode, a pair of collector electrodes, an accelerator electrode, and a pair of gating electrodes so disposed that each influences the space current path from said source of electrons to an assigned one of said collector electrodes substantially independently of the other; means, including a signal source, for applying to said control electrode an input signal subject to frequency deviations with respect to a predetermined frequency; a transformer having a primary winding coupled to said accelerator electrode and a secondary winding tuned to said predetermined frequency for deriving from said accelerator electrode a portion of said input signal having a counterphase component, with respect to said input signal, which is maximum at said predetermined frequency but which decreases with frequency deviations in either sense from said predetermined frequency; means including a phase-advance capacitance-resistance network coupled between said tuned secondary winding and one of said gating electrodes and a phase-delay resistance-capacitance network coupled between a like point on said tuned secondary winding and the other of said gating electrodes for applying, to said gating electrodes, a pair of gating signals having counterphase components, with respect to said input signal, which are balanced at said predetermined frequency but which become unbalanced in opposite senses in response to frequency deviations of said input signal in respectively opposite directions from said predetermined frequency; a pair of energy-storage devices; respective charging circuits, for said pair of energy-storage devices individually including an impedance of substantial magnitude to render the time constant of each of said charging circuits long relative to the period of said predetermined frequency; and respective discharge circuits for said energy-storage devices individually including one of the conduction paths from said electron source to said collector electrodes for establishing, on each of said energy-storage devices, an average charge level of a magnitude determined by the phase relation of said gating signals relative to said input signal, whereby the net charge level on said pair of energy-storage devices represents the frequency deviations of said input signal.

13. A limiter-frequency detector circuit comprising: electron control means including a source of electrons, a pair of control electrodes, and a collector electrode; means, including a signal source for applying to one of said control electrodes an input signal subject to frequency deviations above and below a predetermined center frequency; an output circuit including an energy-storage device coupled to said collector electrode and means for charging said energy-storage device; a transformer having a primary winding and having a secondary winding tuned to said center frequency; means coupling said primary winding to said input signal source to derive a portion of said input signal therefrom; and means coupling said tuned secondary winding to the other of said control electrodes for applying thereto a gating signal having a counterphase component with respect to said input signal of maximum magnitude when said input signal is at said center frequency, but of proportionally reduced magnitude with increasing deviation of said input signal from said center frequency, to establish space current conduction between said source of electrons and said collector electrode in proportion to the magnitude of such deviation, whereby a controlled discharge path for said energy-storage device is established through said electron control means to develop an output signal in said output circuit in response to such frequency deviations of said input signal.

References Cited in the file of this patent

UNITED STATES PATENTS

| | | |
|---|---|---|
| 2,269,688 | Rath | Jan. 13, 1942 |
| 2,274,184 | Back | Feb. 24, 1942 |
| 2,494,795 | Bradley | Jan. 17, 1950 |
| 2,504,626 | Bell | Apr. 18, 1950 |

FOREIGN PATENTS

| | | |
|---|---|---|
| 139,044 | Australia | Feb. 26, 1948 |